US 6,963,411 B1
Nov. 8, 2005

United States Patent
Billow et al.

(54) OPTIMIZED PRINTING SYSTEM

(75) Inventors: Steven A. Billow, Pittsford, NY (US); Sean E. Skelly, Rochester, NY (US); Kenneth D. Stack, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/479,420

(22) Filed: Jan. 7, 2000

(51) Int. Cl.[7] .............................................. B41J 11/44
(52) U.S. Cl. ........................ 358/1.13; 358/1.9; 358/1.16
(58) Field of Search ................................ 358/1.13, 1.9, 358/1.15–1.16, 501, 518

(56) References Cited

U.S. PATENT DOCUMENTS

| | | | | |
|---|---|---|---|---|
| 5,559,933 A | * | 9/1996 | Boswell | 358/1.15 |
| 6,088,480 A | * | 7/2000 | Sakamoto | 382/180 |
| 6,149,323 A | * | 11/2000 | Shima | 400/76 |
| 6,257,693 B1 | * | 7/2001 | Miller et al. | 347/19 |
| 6,571,009 B1 | * | 5/2003 | Nielsen et al. | 382/162 |
| 2003/0112334 A1 | * | 6/2003 | Kiyokawa | 348/207.1 |

OTHER PUBLICATIONS

"Some Simple Techniques for Improving the Print Quality of Digital Images from Kodak Electronic Cameras" by Paul B. Gilman. IS&T's NIP 12: International Conference on Digital Printing Technologies, Oct. 27–Nov. 1, 1996, pp. 227–233.

"Digital Color Management" by Edward J. Giorgianni and Thomas E. Madden. Addison–Wesley, 1998, pp. 419–436.

* cited by examiner

*Primary Examiner*—Gabriel Garcia
*Assistant Examiner*—Thierry L Pham
(74) *Attorney, Agent, or Firm*—Stephen H. Shaw

(57) ABSTRACT

A computer program product is provided for optimizing a printer for driver settings and color profile in order to optimally print an image on a selected media. Data is stored in an index file for various combinations of printers, printer drivers, printer media and color profiles. The printer driver that is currently used on the user's machine for the selected printer is determined and the printer media selected for the printer is identified, e.g., by a simple query of the user. One set of steps involves choosing an appropriate stored color profile for the selected printer-media combination, and applying the chosen color profile to the image data, thereby generating transformed image data. Another set of steps involves retrieving printer settings for the selected printer-media combination and modifying the settings of the driver in use for the selected media. Finally the transformed image data is printed using the modified settings of the printer driver to obtain optimal printing of the image.

20 Claims, 3 Drawing Sheets

OPTIMIZED PRINTING SYSTEM

FIELD OF THE INVENTION

The invention relates generally to the field of printing, and in particular to establishing proper setup of printers and optimization of color for different types of media.

BACKGROUND OF THE INVENTION

Printers, such as inkjet desktop printers, are now capable of making high quality images. To realize this capability, however, a user must be able to properly configure the printer driver software for the appropriate settings, as directed by either the printer manufacturer or the media manufacturer. There is every indication that most users do not appropriately set the driver settings for the media, which makes optimal printing very difficult, if not impossible, to achieve. Furthermore, to obtain consistent, reliable color, the printing path should be color managed according to the most modem techniques. If a color profile is applied for a driver setting different than the setting for which the profile was built, the results are unpredictable at best.

Several high-end software products are available on the market today which allow a knowledgeable user to color manage their images. Adobe Photoshop versions 4.0 and later, for example, permit the use of "plug-ins" which a customer can use to transform images from one color space to another. Press Ready, also by Adobe, permits colorimetric rendering intents for proofing operations. None of these applications, however, automatically select the correct color transforms based upon image source or the user's printer. It is up to the user to correctly identify the profiles to be used. Furthermore, it is still up to the user to configure his or her driver correctly.

Image color matching (ICM) version 1.0 and 2.0 have been incorporated into Microsoft Operating systems Windows 95, Windows 98, and Windows NT 4.0 and later. These systems take advantage of the operating systems embedded Graphics Device Interface (GDI) to correctly manage color between monitors and other output devices. Despite its capability, ICM has been implemented only sporadically in most applications and at times incorrectly. As a result, vendors of both hardware and software have not fully embraced ICM as a solution to their color management needs. As with the imaging applications mentioned above, ICM has no capabilities to automatically set printer driver options.

Printer Drivers by original equipment manufacturers (OEMs) also incorporate color management. For instance, by assuming an input image is in sRGB color space, a printer manufacturer may implement color look-up tables (LUTs) within their printer driver to give excellent reproduced color. This solution, however, has two distinct disadvantages. First, these LUTs will ordinarily be optimized for only one paper formulation—images on other papers will be compromised. By specifying multiple paper types, a printer OEM can additionally support all of their media at the expense of some added complexity. The HP895 driver, for example, supports 16 media types. For obvious reasons, the OEM printer drivers do not ordinarily offer any LUTs optimized for competitive media.

The second disadvantage is that the driver must assume a color space for the image. Because of its location in the imaging chain after GDI, a printer driver has little or no knowledge of the source of the image. Metadata, that is, descriptive data associated with an image, is not persistent beyond the application layer. The need for this assumption is the impetus behind support for a "generic" color space such as sRGB. Despite this support, however, many interpretations of sRGB continue to exist and input devices frequently report sRGB images with different code values. No accommodations for different color spaces (and different input sources) are possible at the driver level without additional user input specifying the input device.

Beyond these problems with color management, the device driver user interfaces still require the user to make the correct selections. All of the color management built into the LUTs is worthless if a user selects the incorrect media or neglects to make any changes beyond the defaults. Because printer drivers are written to be a generic solution for all of the user's needs, multiple settings would need to be made available for user input; consequently, this dependency on the user persists. Some printer drivers exacerbate this problem further by providing confusing, inconsistent, or highly technical options to the user.

As a result, color management tools are (1) out of the reach of typical imaging software applications, and (2) too complicated for most consumers to understand and use. Furthermore, color management systems embedded into operating systems, such as Windows, have been used too inconsistently to provide optimum results and do not provide the ability to change driver settings. What is needed is a way for automating driver setting and color management for the user while requiring very little user intervention.

SUMMARY OF THE INVENTION

An object of the invention is to automatically assist and encourage a user to properly configure a printer driver to the appropriate settings.

Another object of the invention is to provide a printing path that can be color managed for consistent and reliable color.

The present invention is directed to overcoming one or more of the problems set forth above. Briefly summarized, according to one aspect of the present invention, a computer program product is provided for optimizing a printer for driver settings and color profile in order to optimally print an image on a selected media. At an initial stage, data is stored, e.g., in an index file, for various combinations of printers, printer drivers, printer media and color profiles. Next, the printer driver that is currently used on the user's machine for the selected printer is determined and the printer media selected for the printer is identified, e.g., by a simple query of the user. After an appropriate one of the stored color profiles is chosen for the selected printer-media combination, the chosen color profile is applied to the image data, thereby generating transformed image data. The stored printer driver settings for the selected printer-media combination are retrieved and the settings of the driver are thereupon adjusted for the selected media. Finally the transformed image data is printed through the modified settings of the printer driver to obtain optimal printing of the image.

The advantage of the invention is that it automatically determines the user's driver, sets that driver appropriately, and then automatically chooses and applies a color profile built for that printer driver and the user selected media. The user only needs to select a printer and media to make the system operable. Another advantage is that the invention combines and automates the process of properly setting the printer driver and choosing and applying the output color profile. This "closes" the loop to guarantee that driver settings are correct for the selected profile. Otherwise, if a color profile is applied for a driver setting different than the setting for which the profile was built, the results are unpredictable at best.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because printers, printer driver software and color management techniques employing color profiles are well known, the present description will be directed in particular to elements forming part of, or cooperating more directly with, methods and computer programs in accordance with the present invention. In the following description, a preferred embodiment of the present invention will be implemented as a software program. Those skilled in the art will readily recognize that the equivalent of such software may also be constructed in hardware or firmware. Because image manipulation techniques are well known, the present description will be directed in particular to aspects of algorithms and systems forming part of, or cooperating more directly with, the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts.

Before describing the present invention in more detail, it facilitates understanding to note that the present invention is preferably utilized on any well-known computer system, such a personal computer, with any well-known printer using well-known printer media. Consequently, the computer system, printer and media will not be discussed in detail herein. It is also instructive to note that the images are either directly input into the computer system (for example by a digital camera) or digitized before input into the computer system (for example by scanning an original, such as a silver halide film). While this invention finds particular utility in the case of desktop inkjet printers, it should be understood that it is applicable to the setup of printers generally.

Figure 1:
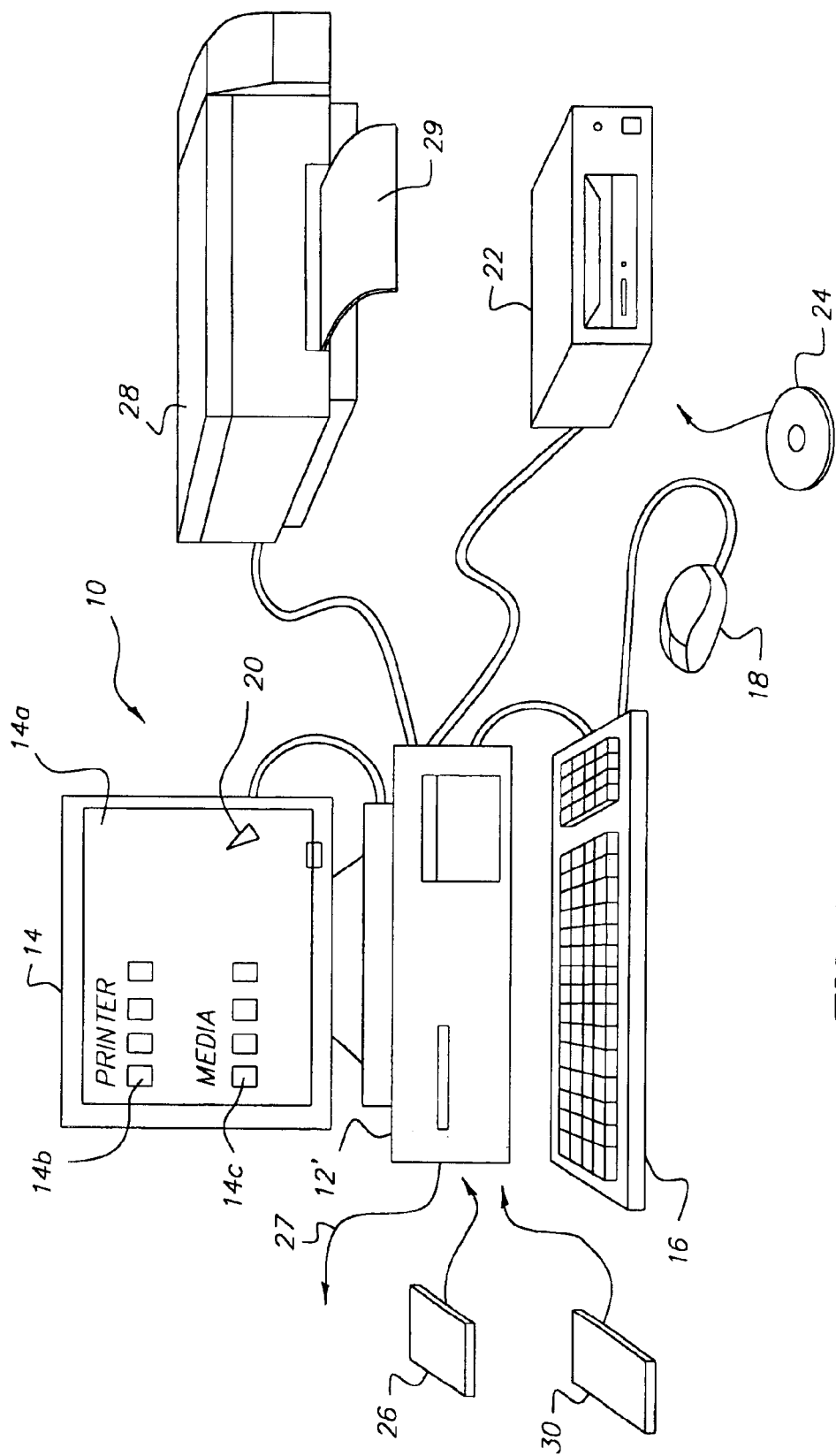
FIG. 1 is a perspective diagram of a computer system interfacing with a printer according to the invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 12 for receiving and processing software programs and for performing other processing functions. A display 14 is electrically connected to the microprocessor-based unit 12 for displaying user-related information associated with the software, e.g., by means of a graphical user interface. A keyboard 16 is also connected to the microprocessor based unit 12 for permitting a user to input information to the software. As an alternative to using the keyboard 16 for input, a pointing device 18 may be used for moving a selector 20 on the display 14 and for selecting an item on which the selector 20 overlays, as is well known in the art.

A compact disk-read only memory (CD-ROM) 22 is connected to the microprocessor based unit 12 for receiving software programs and for providing a means of inputting software programs and other information to the microprocessor based unit 12 via optical storage on a compact disk 24. In implementing the present invention, the software would typically include the presently disclosed computer program product for optimizing a printing system. In addition, a floppy disk 26 (or other magnetic storage, such as magnetic tape) may also include the software program, and is inserted into the microprocessor-based unit 12 for inputting the software program. Still further, the microprocessor-based unit 12 may be programmed, as is well known in the art, for storing the software program internally on solid state electronic storage devices such as random access memory (RAM) or read only memory (ROM), or any other physical device or medium (such as a hard disk) employed to store a computer program. The microprocessor-based unit 12 may also have a network connection 27, such as a telephone line, to an external network, such as a local area network or the Internet (including the World Wide Web), for either receiving the software programs or updates to software programs previously input to the microprocessor-based unit 12.

A conventional printer 28, such as an inkjet desktop printer, is connected to the microprocessor-based unit 12 for printing a hardcopy of the imaging output of the computer system 10 upon conventional printing media 29. As will be described in more detail, the printer 28 is configured to print through a device driver with settings for particular media. In accordance with the invention, the display 14 is electrically connected to the microprocessor-based unit 12 for producing a graphical user interface having a page 14a showing a set of interactive buttons 14b corresponding to different printers that could be used with the computer system 10 and a further set of interactive buttons 14c corresponding to different media that may be used with the supported printers. It is a particular feature of this invention that the user need only click on one of the printer buttons 14b and one of the media buttons 14c to optimize the printing system for the printer and media in use.

Images may also be displayed on the display 14 via a personal computer card (PC card) 30, such as, as it was formerly known, a PCMCIA card (based on the specifications of the Personal Computer Memory Card International Association) which contains digitized images electronically embodied in the card 30. The PC card 30 is ultimately inserted into the microprocessor based unit 12 for permitting visual display of the image on the display 14. Images may also be input via the compact disk 24, the floppy disk 26, or the network connection 27. Any images stored, e.g., in the PC card 30, the floppy disk 26, the compact disk 24 or a hard disk (not shown), or input through the network connection 27, may have been obtained from a variety of sources, such as a digital camera (not shown) or a scanner (not shown). Images may contain "metadata" which details the source of the image and conditions of the capture, which facilitates the selection of an appropriate input profile. Alternatively, a profile may be embedded in this image metadata such as proposed in the JPEG 2000 specification. If none of this data is present, a "generic" input profile (such as one appropriate for sRGB color space) may be chosen.

Figure 2:
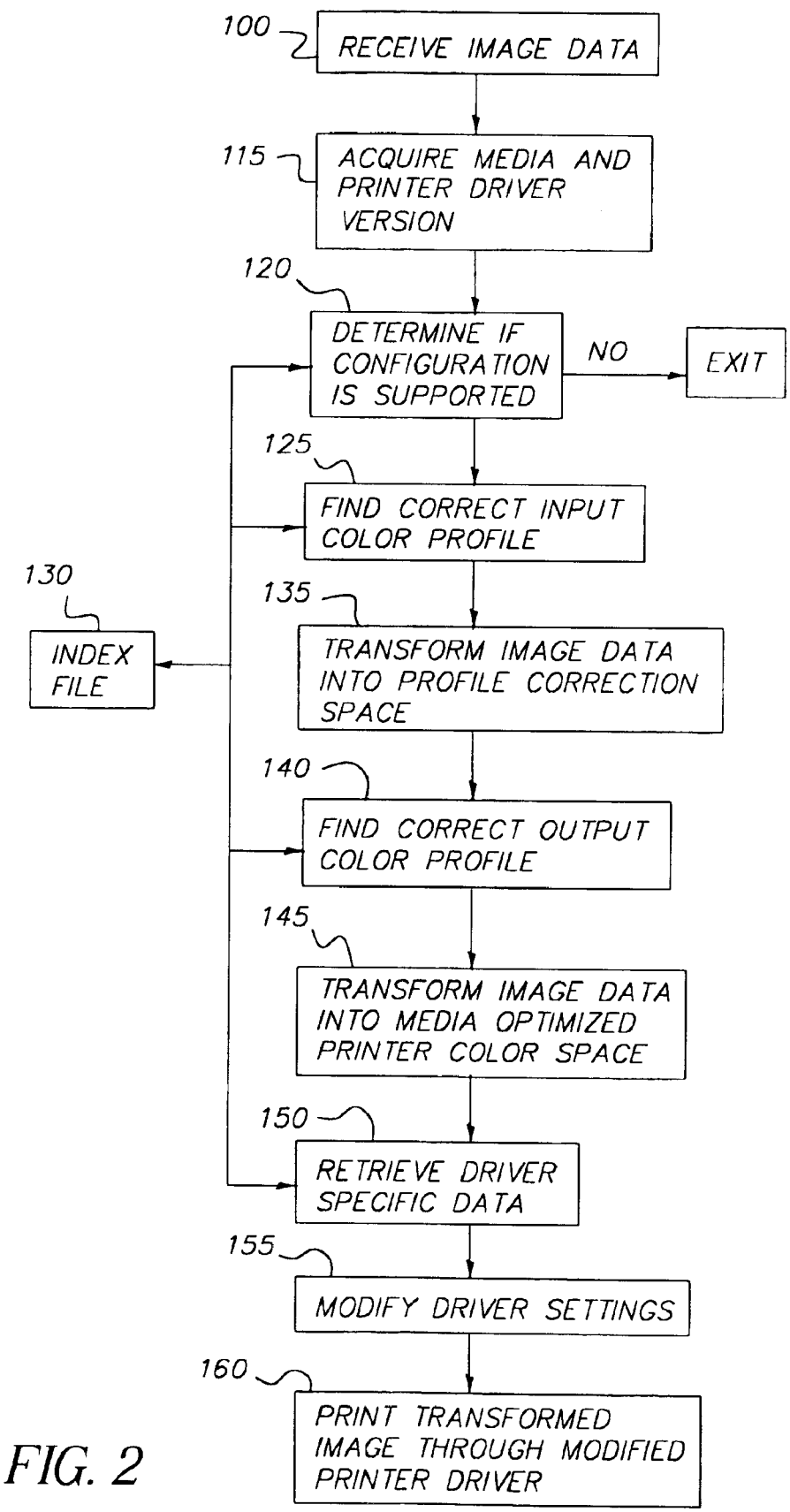
FIG. 2 is a flow diagram of a technique for optimizing a printer for driver settings and color profile according to the invention.

Referring to FIG. 2, the system flow is shown for a technique for optimizing a color printer for driver settings and color profile according to the invention. For the system to function as shown, data regarding the supported printers and media types must be made available to the system. While this data may be provided in a number of ways, in the preferred embodiment the data regarding the supported color printers (including their printer drivers and settings), the supported media types and the color profiles (both input and output) is either stored in an index file 130 or in another file(s) accessible via, e.g., pointers in the index file 130. (While one index file will be described, it should be understood that there could be separate input and output index files, one for example for input color profiles and the other for output color profiles and driver settings.) The index file 130 stores data for implementing optimized printing according to the invention, including such information as:

Identification of the printer
Identification of the media
Appropriate color profiles for the printer-media combination
Appropriate driver settings for the printer-media combination The index file 130 may optionally store other information, as required or as needed for special applications, such as:

Identification of the operating system
Version of the printer driver
Bit/byte length of driver settings in the printer code
Rendering intent (e.g., type and amount of gamut compression and color mapping) The index file 130 needs to be updated as new printers, and printer drivers, or new media are introduced and distributed to the trade. This can be done by generating and distributing wholly new index files or, for example, a web-site can be maintained which houses, or links to, all relevant new file data necessary for proper operation of the system. In the latter case, after the files are downloaded over the network connection 27, the files are stored on the local system 10 for future use. In one typical implementation, the downloaded files update the existing index file 130. As new versions of printer media are distributed, new color profiles can also be released as new index files or downloaded via the network connection 27 from a media web-site, which would ordinarily be maintained by the media manufacturer.

In the beginning of the system flow shown in FIG. 2, the image data is received (in step 100) from a variety of sources, such as the floppy disk 26, the memory card 30 or the network connection 27 shown in FIG. 1. As mentioned before, the images may contain "metadata" which details the source of the image and conditions of the capture, which facilitates the selection of an appropriate input profile, or an input profile may be embedded in this image metadata. The next stage in FIG. 2 involves acquiring and identifying (in step 115) the printer media and the printer driver version. In the preferred embodiment, the printer driver version is determined when the user examines the list of printers that are supported and then clicks on a single user interface, e.g., a button 14*b*, corresponding to the printer in use. Similarly, the media type is acquired by the system when the user clicks on a button 14*c* corresponding to the media in use.

Alternatively, these selections may be made through a standard dialog box. The system next determines (in step 120) whether the selected printer-media configuration is supported by the software; this determination is made by reference to the index file 130. If the requested configuration is not supported, the program exits the optimization system and the printer returns to its default settings (i.e., printing is permitted, but through the more traditional printing that is reliant upon the user's manual interaction with the printer driver and color management tools presented in the user's environment).

The next stage is to process the image data through a unified color management architecture between an input profile and an output profile via a profile connection space. First, the correct input color profile is retrieved (in step 125) from the index file 130. The input color profile provides the information necessary to convert input device values to color values expressed in the profile connection space, which is a fully defined color space used for linking and/or concatenating a series of profiles. Utilizing the correct input color profile for the printer-media combination in use, the input image data is then transformed (in step 135) into the profile connection space. The proper output color profile is retrieved (in step 140) from the index file 130 and the image data in the profile connection space is thereupon transformed (in step 145) into a media optimized printer color space. The output profile provides the information necessary to convert color values expressed in the profile connection space to output device values. Further details of such color management architecture can be found in *Digital Color Management* by E. J. Giorgianni and T. E. Madden, Addison-Wesley: Reading, Mass., 1998, particularly pages 419–436. The profiles used in the preferred embodiment have been specified under the auspices of the International Color Consortium (ICC).

The next stage is to set up the printer for the transformed image data. Generally, as shown in FIG. 2, the driver specific data, such as specific driver settings for the given media, is retrieved (in step 150) from, or by reference to, the index file 130; in the preferred embodiment, a separate file with driver settings is specified in the index file 130, and the program is directed to that file for driver settings. Then the printer driver settings are modified (in step 155) in accordance with the retrieved settings and the printer is actuated (in step 160) to print the transformed image data through the modified driver settings. If the coding scheme, including the bit location and the bit length, for the coded driver settings embedded in the printer code is well known, then setting the printer driver settings (in step 155) becomes a trivial matter. However, if this information is not available, then adjustment of the driver settings requires more ingenuity, as described below.

Each printer typically contains a data structure with basic information about device initialization and environment in a well-defined format that has been standardized across substantially all printers, regardless of manufacturer. This portion of the data structure has generic information germane to most printing applications that is accessible and well-understood by any developer. However, the standard data structure also has an printer-specific portion storing settings for features that are unique for that particular printer. This portion is unstructured in the sense that a printer developer may store information anywhere and in any format the developer chooses; consequently this information is not immediately understood and accessible by someone other than that printer developer. The only requirement that must be adhered to is that the length of the printer-specific portion must be specified in a particular field in the generic portion of the data structure. More specifically, the device driver data is stored in this printer-specific portion of the data structure, that is, in a portion of the data structure having meaning only to a specific printer developer. Since the printer will automatically access this portion of the printer-specific data to set its driver settings, it is critical in this particular embodiment to determine what portion of the printer-specific data structure needs to change and to what values it should be changed. Consequently, the following methodology was devised to locate and extract the printer driver settings from the printer-specific portion:

1. Set up the printer in its standard, default mode.
2. Query and record the data structure.
3. Set up the printer via its own user interface in the preferred mode that is recommended (e.g., by the media manufacturer) for a particular media supported by this invention. This set up will change the data structure.
4. Query and record the modified data structure (with its different settings).
5. Use a conventional file compare utility to ascertain which bits changed between the two settings and what the respective values are for those bits with the different settings. These settings represent the bits necessary to implement the optimum driver settings.
6. Store the bit locations and the desired bit values in a data file for that specific printer—media combination. This procedure is then repeated as often as necessary in order to catalog all the printer—media combinations that will be stored in the index file 130 and thus supported by the system.

Figure 3:
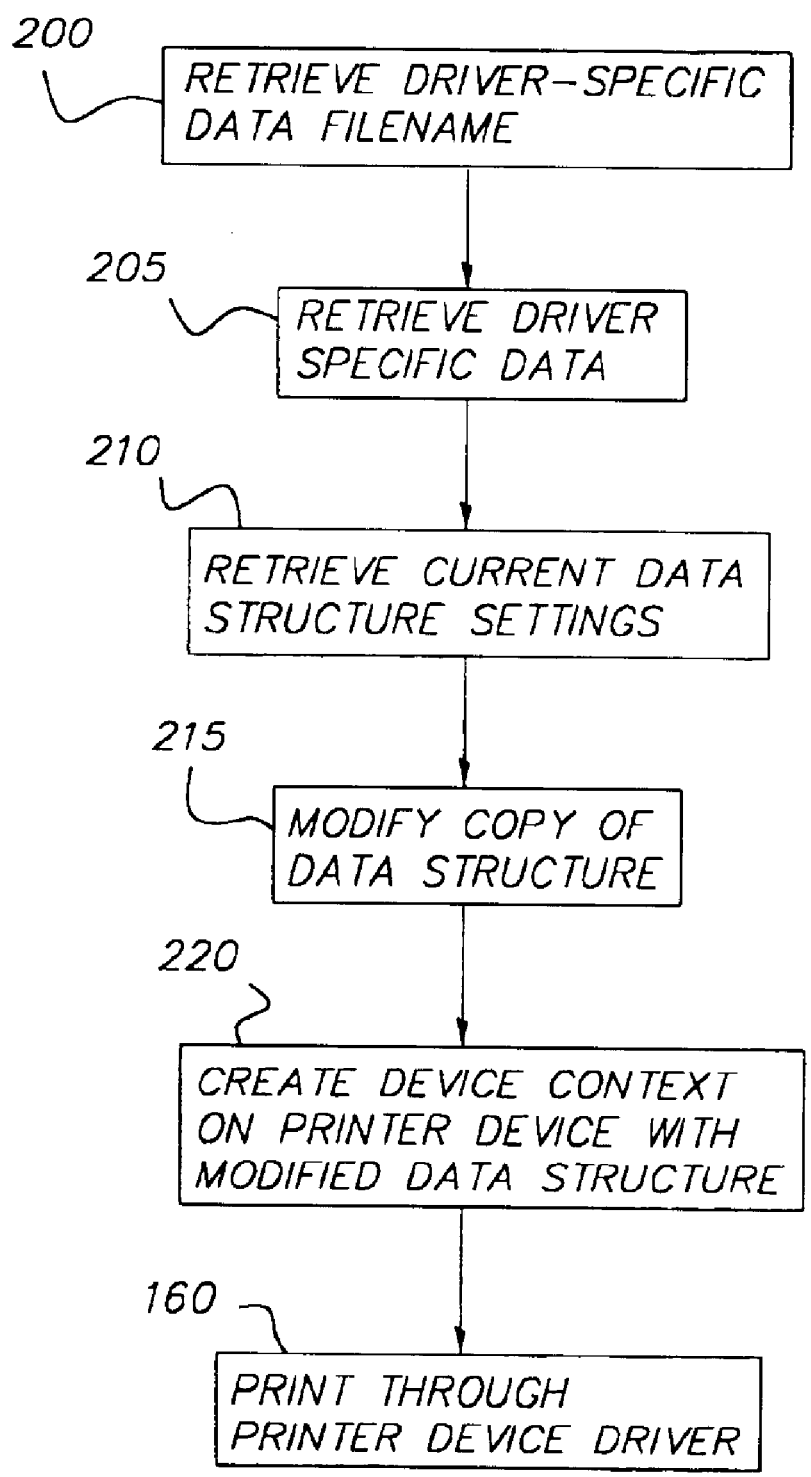
FIG. 3 is a flow diagram showing more detail of one technique for retrieving driver specific data as generally shown in FIG. 2.

Once these pre-calculated bit values for the driver settings have been stored in the index file 130, the technique shown in FIG. 3 is used to modify the printer data structure for the optimum driver settings. More specifically, the following steps expand upon steps 150 and 155 shown in FIG. 2. The first stage is to retrieve (in step 200) the driver specific data filename, which includes the appropriate pre-calculated driver settings, from the index file 130 so as to be able to query and modify the data structure in the printer. Then the driver-specific data is retrieved (in step 205) from the printer data structure file and the current driver specific bits are retrieved (in a step 210) from the data structure. The bit locations in the printer data structure file are modified (in a step 215) with the driver settings retrieved from the data file for the particular printer-media combination. The application can then create a device context with this new data structure. Next, referring to FIG. 2, the printer prints (in step 160) the transformed image data using the new data structure to determine its mode of printing. Finally, although not shown in the Figures, it is preferable to return the driver settings to their original default values.

Except for the reception of image data in the beginning and the printing stage at the end, the order of the steps in FIG. 2 is merely illustrative of one way of implementing the invention. In other words, the system flow shown in FIG. 2 represents one possible sequence of steps to achieve the objective of optimal printing, for example, a sequence in which the steps 125, 135, 140 and 145 of manipulating the input and output color profiles relative to a profile connection space are performed before the steps 150 and 155 of retrieving the driver specific data and modifying the driver settings. An alternative version with substantially the same effect would have these steps rearranged with the driver specific data retrieved and used to modify the driver settings before doing the transformation into and out of profile connection space, that is, with steps 150 and 155 preceding steps 125 through 145. Another version could have the color profile steps 125 through 145 and the driver setting steps 150 and 155 running in parallel. Moreover, the input and output profiles could first be concatenated and applied to the profile connection space. Other arrangements may also be obvious to the skilled person. Consequently, the sequence of these steps as they appear in the claims should be understood to be interchangeable as set forth above.

The use of an index file 130 has been described in reference to a preferred embodiment for storing, or referring to, the aforementioned data for implementing optimized printing according to the invention. Such data includes identification of the printer, identification of the media, appropriate color profiles for the printer-media combination, appropriate driver settings for the printer-media combination, identification of the operating system, the version of the printer driver, the bit/byte length of driver settings in the printer code, and the rendering intent. Typically, as previously explained, the color profiles and/or driver settings are stored in separate files accessible via the index file 130. Though perhaps somewhat more cumbersome, this data regarding the printer-media combination could be dispersed and stored, e.g., in a header associated with each of the color profiles and/or driver settings files in lieu of being in an index file. Then each header will identify the specific printer-media combination appropriate for that color profile and/or driver settings. The aforementioned system would then search through each color profile and/or driver settings file in turn until the correct match is found for the printer and media in use.

The invention has been described with reference to a preferred embodiment. However, it will be appreciated that variations and modifications can be effected by a person of ordinary skill in the art without departing from the scope of the invention. For example, the file 130 may contain other types of data, for instance information relating to the rendering intent selected for the printer. Such information might include particular color profiles for particular intents, such as to adjust compression for the image data In that case, the rendering intent selected for the printer would be identified and the and the appropriate color profile for the rendering intent would be used to transform the image data.

PARTS LIST 10 computer system
12 microprocessor-based unit
14 display
14a page
14b buttons
14c buttons
16 keyboard
18 pointing device
20 selector
22 CD-ROM
24 CD
26 floppydisk
27 network connection
28 printer
29 media
30 PC card

What is claimed is:

1. A computer program product for automatically optimizing any one of a plurality of printers for driver settings and color profile in order to optimally print an image, said computer program product comprising: a computer readable storage medium having a computer program stored thereon for automatically performing the steps of:

(a) initially, providing preexisting data without user input, via an optimized printing system that correlates to a plurality of printers, printer drivers, printer media and color profiles that are stored on an accessible storage medium;

(b) receiving image data corresponding to the image;

(c) receiving from the accessible storage medium the preexisting data for the plurality of printers printer drivers, printer media and color profiles;

(d) determining which one of the printer drivers is to be used on the printer;

(e) identifying the printer media selected for the printer;

(f) automatically, retrieving printer driver settings for the selected printer media from the preexisting data;

(g) automatically, modifying settings of the printer driver in use with the retrieved printer driver settings;

(h) automatically, choosing an appropriate color profile from the preexisting data for the printer driver, the driver settings and the media selected for the printer;

(i) automatically, applying the color profile to the image data; and (j) wherein the file data for the plurality of printers, printer drivers, printer media and color profiles are stored in an index file, and wherein step (c) comprises receiving data from the index file or from a data filed indicated by the index file.

2. The computer program product as claimed in claim 1 further comprising the step (k) of initiating a printing operation with the modified driver settings.

3. The computer program product as claimed in claim 1 wherein step (c) further comprises:

(c1) connecting with a network;

(c2) receiving file data over the network regarding the printers, printer drivers, printer media and color profiles.

4. The computer program product as claimed in claim 1 wherein step (c) further comprises:

(c1) connecting with network;

(c2) updating the index file with data that is received over the network regarding the printers, printer drivers, printer media and color profiles.

5. The computer program product as claimed in claim 1 where the step (d) of determining which one of the printer drivers is to be used on the printer is initiated by a user making a printer selection through a single user interface.

6. The computer program product as claimed in claim 1 where the step (e) of identifying the printer media selected for the printer is initiated by a user making a printer media selection through a single user interface.

7. The computer program product as claimed in claim 1 where the step (d) of determining a printer driver is initiated by a user selection of a printer through a standard printer dialog box.

8. The computer program product as claimed in claim 1 wherein step (c) further includes receiving file data regarding rendering intent and wherein the computer program product further comprises the steps of:

(k) identifying the rendering intent selected for the printer; and (l) selecting the appropriate color profile for the rendering intent.

9. The computer program product as claimed in claim 1 wherein steps (h) and (i) are performed before steps (f) and (g).

10. The computer program product as claimed in claim 1 wherein steps (h) and (i) are performed in parallel with steps (f) and (g).

11. The computer program product as claimed in claim 1 wherein the step (h) of choosing an appropriate color profile comprises choosing an appropriate input and output color profile from the file data.

12. The computer program product as claimed in claim 11 wherein the input and output color profile are concatenated together.

13. The computer program product as claimed in claim 1 wherein step (c) comprises receiving separate files for at least one of the color profiles and driver settings, and wherein said separate files include a header portion that identifies the printer and printer media appropriate for each said separate file.

14. The computer program product as claimed in claim 13 wherein step (f) of retrieving driver settings comprises searching the headers of the separate files until a match is found for the selected printer media.

15. The computer program product as claimed in claim 13 wherein step (h) of choosing an appropriate color profile comprises searching the headers of the separate files until a match is found for the printer driver, the driver settings and the media selected for the printer.

16. A computer program product for interfacing with a user and optimizing any one of a plurality of printers for driver settings and color profile in order to optimally print an image, said computer program product comprising: a computer readable storage medium having a computer program stored thereon for performing the steps of:

(a) receiving image data corresponding to the image;

(b) automatically, accessing an index file with preexisting data corresponding to a plurality of printers, printer drivers, printer media and color profiles;

(c) interfacing with the user to determine which one of the printers is being used;

(d) determining from the index file which printer driver is being used;

(e) interfacing with the user to identify the printer media selected for the printer;

(f) automatically, adjusting the settings of the driver for the selected printer media;

(g) automatically, choosing an appropriate color profile from the index file for the printer driver, the driver settings and the media selected for the printer; and (h) automatically, applying the color profile to the image data.

17. The computer program product as claimed in claim 16 further comprising the step (i) of initiating a printing operation.

18. The computer program product as claimed in claim 16 wherein steps (g) and (h) are performed before step (f).

19. The computer program product as claimed in claim 16 wherein steps (g) and (h) are performed in parallel with step (f).

20. The computer program product as claimed in claim 16 wherein the printer is queried for presence of the selected printer media.

* * * * *